(No Model.) 4 Sheets—Sheet 1.
T. DE DIENHEIM BROCHOCKI.
BRIDGE.
No. 377,887. Patented Feb. 14, 1888.
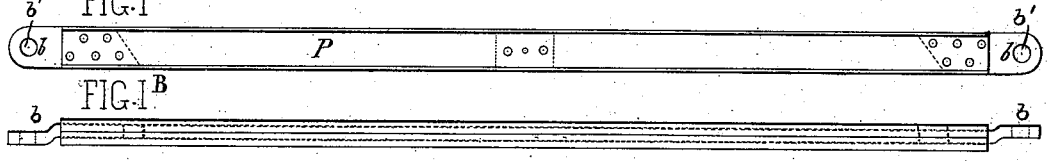
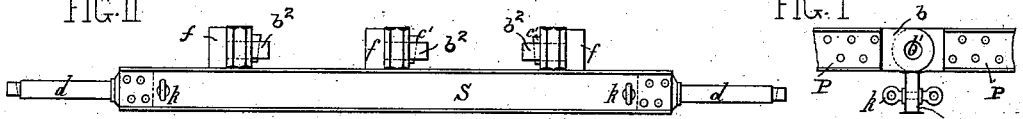
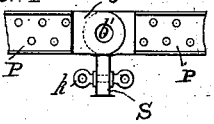
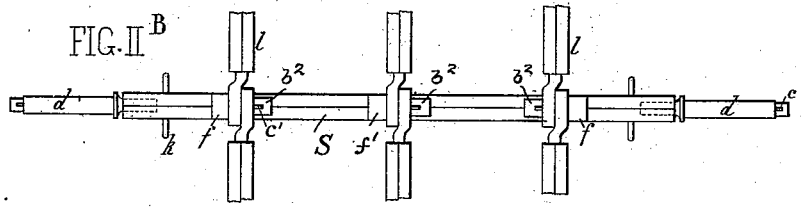
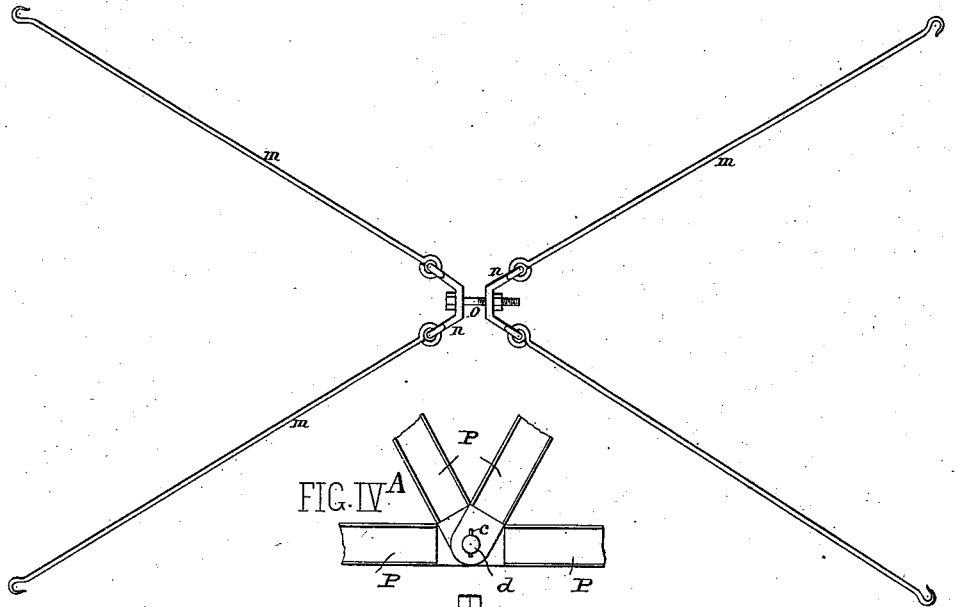
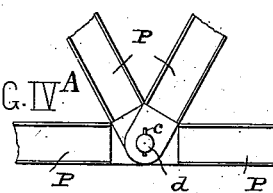
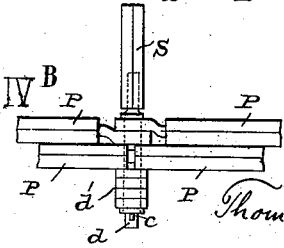

(No Model.) 4 Sheets—Sheet 2.
T. DE DIENHEIM BROCHOCKI.
BRIDGE.
No. 377,887. Patented Feb. 14, 1888.
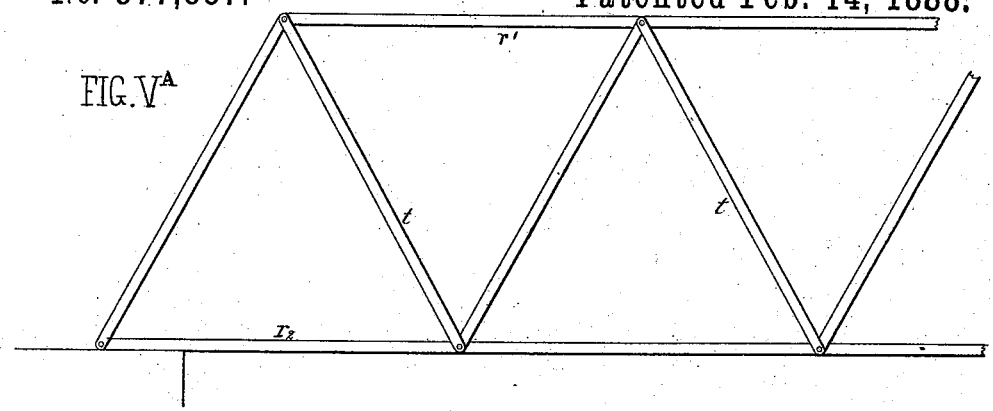
FIG. V^A
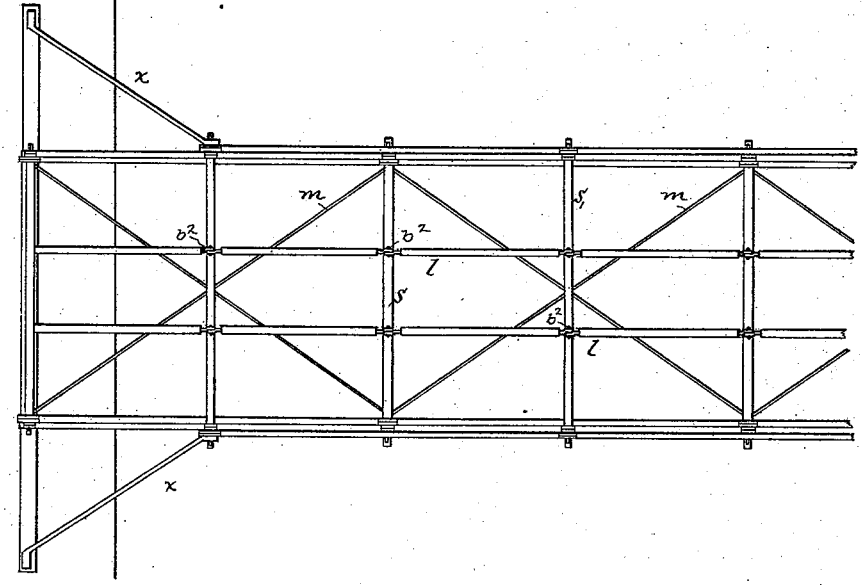
FIG. V^B
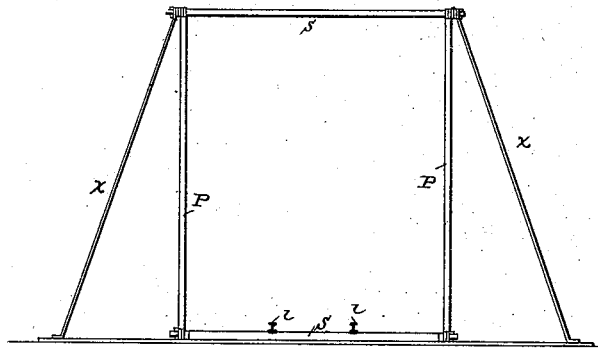
FIG. V^C
Witnesses.
John Boyd.
Wm. Brossmann.
Inventor
Thomas de Dienheim Brochocke
by J. Ellis Bowen
Attorney (No Model.) 4 Sheets—Sheet 3.
T. DE DIENHEIM BROCHOCKI.
BRIDGE.
No. 377,887. Patented Feb. 14, 1888.
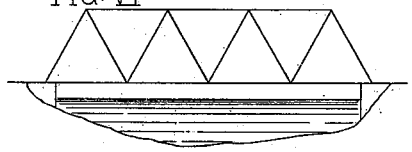
FIG. VI
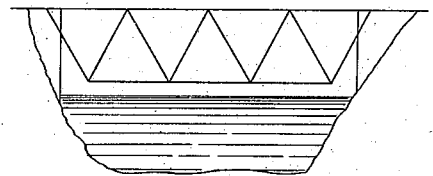
FIG. VII
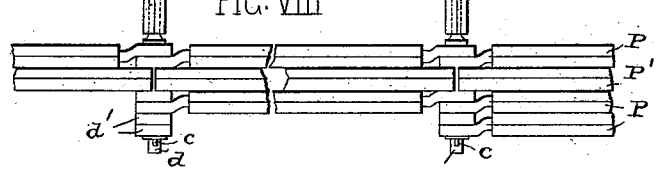
FIG. VIII
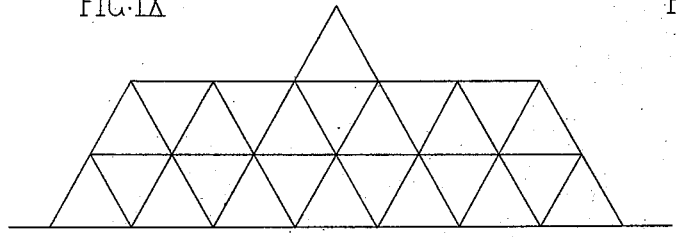
FIG. IX ᴬ
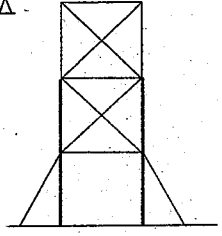
FIG. IX ᴮ
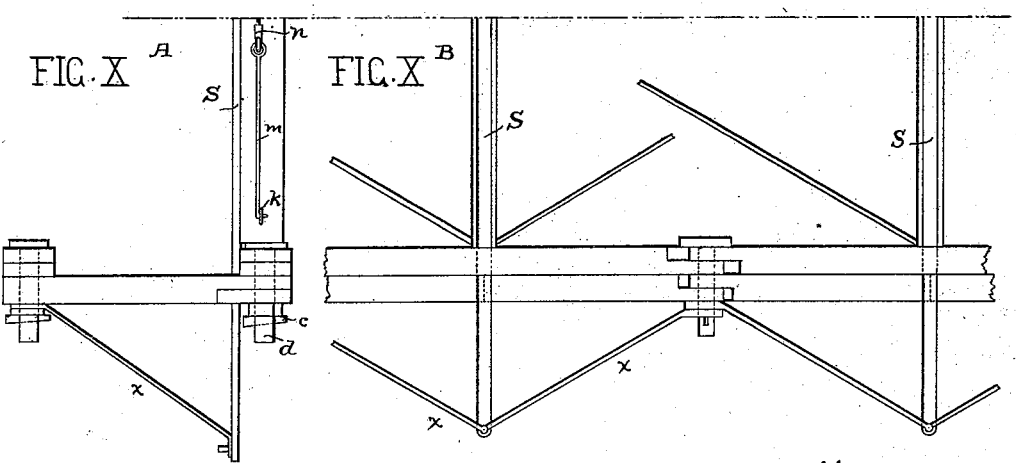
FIG. X ᴬ  FIG. X ᴮ
Witnesses.
John Boyd.
Wm Brossmann.
Inventor.
Thomas de Dienheim Brochocki
by J.E.W. Bowen
Attorney.

(No Model.)
4 Sheets—Sheet 4.
T. DE DIENHEIM BROCHOCKI.
BRIDGE.
No. 377,887.
Patented Feb. 14, 1888.
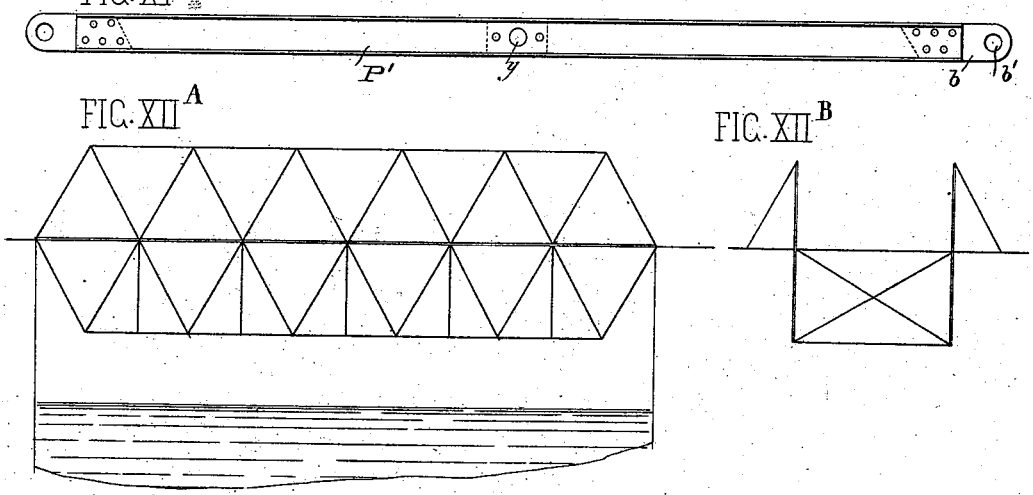
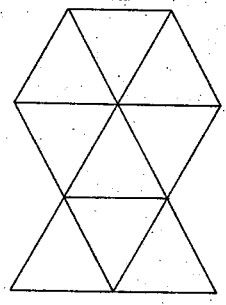
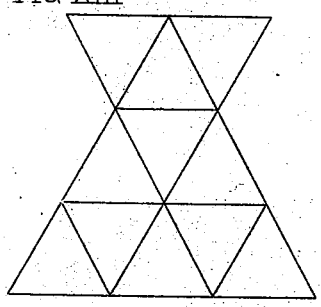
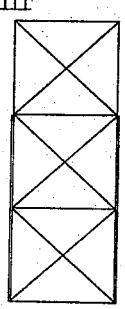
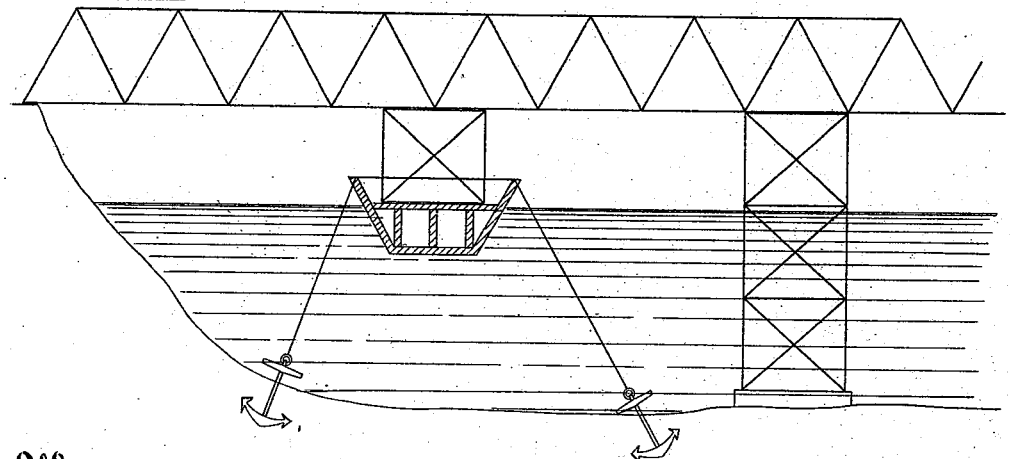
Witnesses:
John Boyd
Wm. Brossmann
Inventor
Thomas de Dienheim Brochocki
by J. E. M. Bowen
Attorney.

UNITED STATES PATENT OFFICE.

THOMAS DE DIENHEIM BROCHOCKI, OF PARIS, FRANCE.

BRIDGE.

SPECIFICATION forming part of Letters Patent No. 377,887, dated February 14, 1888.

Application filed March 5, 1887. Serial No. 229,886. (No model.) Patented in France March 30, 1886, No. 161,065; in Italy April 28, 1886, No. 19,844, and in Austria-Hungary October 6, 1886, No. 14,874 and No. 45,874.

*To all whom it may concern:*

Be it known that I, Count THOMAS DE DIENHEIM BROCHOCKI, of Paris, France, have invented a new and useful Improvement in Bridges, (which has heretofore been patented to me by the Government of France, dated March 30, 1886, No. 161,065; Italy, dated April 28, 1886, No. 19,844, and Austria-Hungary, dated October 6, 1886, No. 14,874 and No. 45,874;) and I hereby declare the following to be a full and clear description thereof.

The object of this invention is to construct a bridge with the fewest possible number of parts, and so far as practicable to make these parts interchangeable—as, for instance, to make certain pieces of such peculiar size, shape, form, &c., as will render them suitable for the bottom or top chords or the trussing-braces of a bridge system, and all of the other parts of the structure are adapted to this simple form of construction.

The invention will be readily understood by reference to the accompanying drawings, of which—

Figure $I^A$ is a side elevation of one of the interchangeable parts, of which may be constructed either one of the chords of the bridge or its vertical trussing system. Fig. $I^B$ is a plan of the piece shown in Fig. $I^A$. Fig. $I^C$ is an elevation of a joint or coupling of two of the said principal parts, so as to form a part of one of the bridge-chords thereof. Figs. $II^A$ and $II^B$ are respectively a side elevation and a plan of a transverse beam. Fig. III is a detailed drawing of the transverse bracing-rods of the system. Figs. $IV^A$ and $IV^B$ are respectively a side elevation and a plan view of an assembling-joint for two chord-pieces and two trussing-braces. Figs. $V^A$, $V^B$, and $V^C$ are respectively a side elevation, a general plan, and a transverse sectional elevation of a through-bridge built on this improved plan. Figs. VI and VII are respectively general designs for a through and a deck bridge. Fig. VIII is a detail drawing of one method of increasing the dimensions, and correspondingly the strength, of either chord at the point of greatest strain. Fig. $IX^A$ and $IX^B$ are general designs for increasing the strength of the structure by building up its height of the same uniform material, being respectively a side and end elevation of a bridge constructed on this principle. Figs. $X^A$ and $X^B$ are respectively an end and a plan view of half designs for a through-bridge without overhead transverse beams, said views being turned down on one side. Fig. XI is a detailed side elevation of a principal interchangeable part, of double the length of that shown in Figs. $I^A$ and $I^B$, for spanning two panels of a chord-piece. Figs. $XII^A$ and $XII^B$ are respectively a side and an end view of designs for a deck-bridge without overhead transverse beams.

It is obvious that any suitable material may be used for this my improved structure; but I prefer to make the principal parts in the form of a metallic I-beam, P, of suitable size and of such strength as to adapt it to use for either one panel-piece for either the lower or the upper chord of the bridge structure, or for one of the braces of the supporting-truss system.

In Figs. $I^A$ and $I^B$, I have shown two of these I-beams riveted together side by side, so as to form a sort of a box-girder or beam. Tenon-pieces $b$ are secured to or formed on each end of this structural piece P, as shown in the said figures, and these tenon-pieces are respectively bent to the right and left on the opposite ends of the said piece, so as to readily adapt it to any desired place in the bridge structure and to join with other pieces similarly made, and when so joined end to end the pieces P will be in exact alignment. Each of these tenons is provided with a transverse hole, $b'$, through which is thrust the assembling-arm of the transverse beam, as presently explained.

The transverse floor-beams S have assembling bolts or pins $d$ formed upon their ends, which said pins pass through the holes $b'$ of the bars P, and thus hold the ends of the said bars P in their proper positions in the structure, as shown best in Figs. $IV^A$ and $IV^B$. The pins $d$ may be either cylindrical or polygonal in form, and the holes $b'$ will of course be of a corresponding formation and adapted to easily receive them. At the outer ends of the said pins $d$ they are fitted with washers $d'$ and with tapering key-pieces $c$, driven through tapering mortises formed in the pins $d$, and the whole adapted to hold the structure securely together. Thus it will be observed the three principal members of a truss-bridge—viz., the upper chord, $r'$, the lower chord, $r^2$, and the trussing braces and ties $t$—are respectively formed of a common member—the bar P—constructed as above described, and when these parts are assembled together in the bridge they form in figure an equilateral triangle, as shown in Fig. V$^A$ and in the general designs for different forms of my bridge structure. Similar pieces, P, to those above described are also used for the balks or floor-beams $l$, as shown in Figs. II$^A$, II$^B$, V$^B$, and V$^C$. The adjacent ends of a pair of these floor-beams meet on top of a transverse beam, S, and are there assembled together by an assembling pin or bolt, $b^2$, held in position by a brace-block, $f$, secured to the transverse beam S. Near the ends of the transverse beams S they are provided with eyebolts $k$, projecting from their sides, as seen in Fig. X$^A$, in such a manner as to readily receive the hooked ends of the lateral or sway-bracing rods $m$. These sway-braces may be formed simply of two rods placed X-wise in each panel of the bridge, or they may be formed of four shorter rods, as shown in Fig. III. In this case the outer end of each rod is formed into a hook adapted to hook into the eyebolts $k$, and their inner ends are hooked into U-shaped pieces $n$, the loops of which in each pair are drawn together by a tightening-bolt, $o$. This compound form of sway-bracing rods is preferable in cases where the longer single rods could not be readily transported.

In cases where the length of the bridge-span requires increased strength in special parts of either chord this my improved system admits of such added strength at the required point by adding members P at the side of the built chord in the required place, as shown in Fig. VIII, wherein the double-length member P', Fig. XI, may be employed, its central eye, $y$, adapting it to span and break joint with the members $p$, or the height of the truss may be indefinitely increased by building it up with the same members P to any desired height, one truss on top of another, as shown in Figs. IX$^A$, IX$^B$, XIII$^A$, XIII$^B$, and XIII$^C$. The same form of structure may be also used with equal facility for a through-bridge, as in Fig. VI, or for a deck-bridge, as in Fig. VII, or for the supports or piers of a long bridge, as in Fig. XIV, where this form of structure is shown as forming a pier in mid-stream, and also a cradle or seat resting on a ponton.

In addition to the sway-bracing $m$, above described, outside lateral braces $x$ may be used at the ends of the bridge, as in Fig. V$^C$, or as in Figs. X$^A$ and X$^B$. The form shown in the latter-named two figures is adapted to bridges having such low side trusses as to preclude the possibilities of overhead beams and braces, and in this case the transverse beams S are extended far enough outside of the bridge sides to form supports for the outer or lower ends of the transverse braces $x$.

Having described my invention, I claim—

1. The herein-described beam for use in bridge-building, the same comprising a straight bar, P, and a tenon-piece, $b$, at each end thereof of substantially half the lateral thickness of said bar, said tenon-pieces being bent to the right and left at the opposite ends of said bar, respectively, whereby their outer faces are flush with that of the bar, and said tenon-pieces being provided with transverse holes $b'$.

2. The herein-described transverse floor-beam for use in bridge-building, the same comprising a straight bar, S, having axial pins $d$, extending from each end thereof, and L-shaped pins $f$ $b^2$, extending from its side.

3. The herein-described bridge, the chord, truss, and tie pieces whereof are composed of uniformly-sized beams P, having laterally-perforated tenons $b$ at each end, and the transverse floor and brace beams whereof are composed of uniformly-sized beams S, having axially-extending pins $d$, passing through the eyes in said tenons for locking the parts together.

4. In a bridge, the combination, with the chord, truss, tie, and transverse beams, of the sway-brace connecting said transverse beams, said brace comprising four rods, $m$, each secured at one end to the transverse beams near their ends, the two U-shaped pieces $n$, to the ends of which the other ends of said rods $m$ are attached, and the bolt $o$, passing through the centers of said U-shaped pieces for tightening the brace, substantially as described.

5. In a bridge, the combination, with the transverse bars, of the chord-bars, the latter comprising a number of equally-sized beams, P, and a number of equally-sized beams, P', the latter being double the length of the former, each of said beams being provided with laterally-perforated tenons at each end and the larger beams with central perforations, by means of which perforations the beams are fastened in position, substantially as described.

In testimony that I claim the foregoing as my own I have hereunto affixed my signature in presence of two witnesses.

THOMAS DE DIENHEIM BROCHOCKI.

Witnesses:
ROBT. M. HOOPER,
T. TROXTON.